(12) United States Patent
Hiraguchi

(10) Patent No.: US 6,964,391 B2
(45) Date of Patent: Nov. 15, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 129 days.

(21) Appl. No.: 10/396,829

(22) Filed: Mar. 26, 2003

(65) Prior Publication Data

US 2003/0183716 A1    Oct. 2, 2003

(30) Foreign Application Priority Data

Mar. 29, 2002    (JP)    ............................. 2002-097214

(51) Int. Cl.$^7$ .......................................... G11B 23/107
(52) U.S. Cl. ............................. 242/348.2; 242/332.3; 242/332.8; 242/532.6; 242/587.2
(58) Field of Search ........................... 242/348, 348.2, 242/332.4, 332.8, 532.6, 587.1, 587.2, 584, 242/584.1

(56) References Cited

U.S. PATENT DOCUMENTS

| | | | |
|---|---|---|---|
| 4,452,406 A | * | 6/1984 | Richard .................... 242/348.2 |
| 5,219,129 A | | 6/1993 | Spicer et al. |
| 5,261,626 A | * | 11/1993 | Hoge et al. .............. 242/348.2 |
| 6,135,379 A | * | 10/2000 | Argumedo ............... 242/348.2 |
| 6,241,171 B1 | | 6/2001 | Gaboury |

* cited by examiner

Primary Examiner—Kathy Matecki
Assistant Examiner—Evan Langdon
(74) Attorney, Agent, or Firm—Sughrue Mion, PLLC

(57) ABSTRACT

A recording tape cartridge rotatably accommodating, within a case, a reel on which a recording tape is wound. A leader portion is provided at a distal end of the recording tape. The leader portion has a leader tape connected to the recording tape, and holding blocks provided at vertical direction outer sides of a distal end of the leader tape. In a state in which the holding blocks are held so as to face an opening of the case, the holding blocks are exposed from cut-out portions. Due to the holding blocks being nipped and held by a guiding mechanism of a drive device and the guiding mechanism moving, the holding blocks are separated from the case.

14 Claims, 12 Drawing Sheets

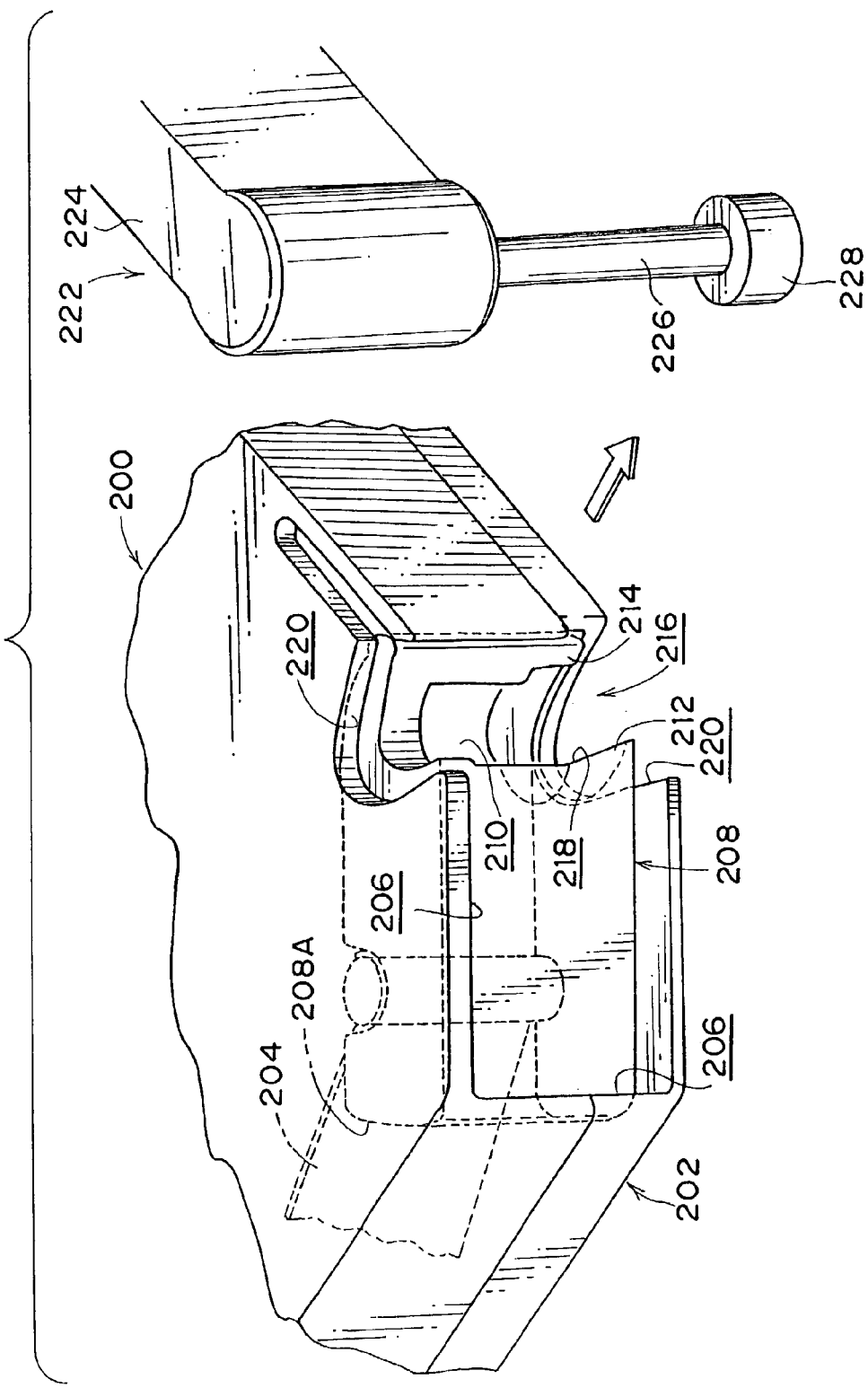

RECORDING TAPE CARTRIDGE

BACKGROUND OF THE INVENTION

1. Field of the Invention

The present invention relates to a recording tape cartridge which rotatably accommodates a single reel on which a recording tape, such as a magnetic tape or the like, is wound.

2. Description of the Related Art

Recording tapes such as magnetic tapes and the like are used as external recording media for computers and the like. The recording surface area of a recording tape is large, and the recording tape is used mainly for back-up of a large quantity of information. Thus, it is desirable to prevent dust from adhering to the recording tape, and for the space for accommodating the recording tape at the time of storage thereof to be small.

Thus, a recording tape cartridge, in which a recording tape is wound on a single reel and which rotatably accommodates the reel within a case, is used. In this way, owing to the case, dust can be prevented from adhering to the recording tape. Moreover, the accommodating space during storage can be made to be substantially half that of a structure having two reels which take-up a recording tape at the time information is to be recorded onto or played back from the recording tape.

In such a recording tape cartridge, while the recording tape is pulled-out from the case within a drive device, information is recorded onto the recording tape or information recorded on the recording tape is played back by a recording/playback head within the drive device. Hereinafter, a structure by which the drive device pulls out the recording tape will be described with reference to FIG. 12.

In a recording tape cartridge 200, an opening 206 for pulling-out of a recording tape 204 is formed in a case 202 which accommodates an unillustrated reel (see FIG. 12). A leader block 208 is connected to the distal end of the recording tape 204. The leader block 208 is held within the case 202 so as to face the opening 206, and, in this state, closes the opening 206.

An engaging concave portion 210 is provided at the distal end of the leader block 208. The lower portion of the engaging concave portion 210 is formed as a large diameter concave portion 218, whose opening 216 is narrowed by engagement portions 212, 214. A pair of upper and lower cut-out portions 220, which expose the engaging concave portion 210 (the large diameter concave portion 218) upwardly and downwardly, are provided above and below and communicate with the opening 206 of the case 202.

A pull-out device 222 is provided within the drive device. The pull-out device 222 has an arm 224, a rod 226, and a large diameter portion 228. The arm 224 is guided by an unillustrated cam groove and can move in a predetermined direction. The rod 226 can enter into the engaging concave portion 210 through the opening 216. The large diameter portion 228 is provided at the distal end of the rod 226, and cannot pass through the opening 216. The diameter of the large diameter portion 228 is slightly smaller than that of the large diameter concave portion 218.

When the recording tape cartridge 200 is loaded into the drive device, accompanying this loading operation, the rod 226 of the pull-out device 222 enters into the engaging concave portion 210 of the leader block 208. Then, when the recording tape cartridge 200 moves downward, the large diameter portion 228 of the pull-out device 222 enters into the large diameter concave portion 218 of the leader block 208 from beneath.

In this state, when the arm 224 of the pull-out device 222 moves along a horizontal plane, the leader block 208 separates from the case 202 while the engagement portions 212, 214 of the leader block 208 engage with the large diameter portion 228 and are held at the pull-out device 222. In this way, the recording tape 204 connected to the leader block 208 is pulled-out from the case 202.

The leader block 208 is fit in (accommodated in) a fit-in portion provided at a reel hub of a take-up reel of the drive device by the pull-out device 222. An end surface 208A, which is at the side opposite the engaging concave portion 210, forms the outer peripheral surface of the reel hub and a take-up surface along which the recording tape is taken-up. In this state, when the take-up reel is driven to rotate, the recording tape is successively pulled-out from the case while being taken-up onto the take-up surface. Information is recorded onto or played back from the recording tape by a recording/playback head provided along a predetermined tape path.

However, in the above-described conventional recording tape cartridge 200, the large diameter concave portion 218, into which the large diameter portion 228 of the pull-out device 222 enters, must be provided at the leader block 208. Accordingly, a problem arises in that the width of the leader block 208 increases.

If the width of the leader block 208 is large, the position at which the leader block 208 is held at the case 202 is limited, and there are fewer degrees of freedom in designing the recording tape cartridge 200. Moreover, the opening width of the fit-in portion of the aforementioned reel hub must be made large, and this is a cause of a step arising at the take-up surface.

Recording tape cartridges which are equipped with small, solid-cylindrical leader pins instead of the leader block 208 are known. One example is the cartridge which relates to a drive device and which is disclosed in Japanese Patent Application Laid-Open (JP-A) No. 2000-331403. The leader pin separates from a case while being caught by a pull-out means which enters into the case. The operation of this pull-out means is complex. Thus, at the pull-out means, in addition to the above-described arm 224, there is the need for a complex mechanism for driving the catching portion which catches on the leader pin. In this way, in a conventional recording tape cartridge equipped with a leader pin, the structure of the drive device is complex.

SUMMARY OF THE INVENTION

In view of the aforementioned, an object of the present invention is to provide a recording tape cartridge which is provided with a leader portion held by a pull-out means of a drive device by a simple operation of the pull-out means, and which aims to make the leader portion more compact.

In order to achieve the above-described object, the present invention provides a recording tape cartridge having a case, an opening, a leader portion, and cut-out portions. The case is formed to be hollow by a ceiling plate and a bottom plate which oppose one another being joined by peripheral walls. The case rotatably accommodates, in an interior thereof, a single reel on which a recording tape is wound. The opening is provided in the peripheral walls, and is for pulling-out of the recording tape from the case. The leader portion is provided at a distal end of the recording tape. The leader portion is usually held within the case so as to face the opening. At a time when the recording tape is to be pulled out from the case, the leader portion is separated from the case while being nipped from above and below by a pull-out device of a drive device. The cut-out portions are a pair of upper and lower cut-out portions, and communicate with the opening at opposing positions of the ceiling plate and the bottom plate, respectively. The cut-out portions expose upper and lower ends of the leader portion when the leader portion is in a state of being held at the case.

In the recording tape cartridge of the present invention, usually, the leader portion, which is provided at the distal end portion of the recording tape, is held within the case so as to face the opening of the case. In this state, the top and bottom ends of the leader portion are exposed from the cut-out portions of the case.

When information is to be recorded on the magnetic tape or when information recorded on the magnetic tape is to be played back, the leader portion is separated from the case while being nipped from above and below by the pull-out device of the drive device which has entered in from the pair of cut-out portions. In this way, the recording tape is pulled out from the case through the opening.

Here, the leader portion is merely nipped by the pull-out device from the top and bottom of the leader portion which are exposed to the exterior of the case. Thus, it suffices for the pull-out device to nip the leader portion after the pull-out device has reached positions above and below the exposed cutout portions (i.e., has reached the nipping positions). Namely, the leader portion is held by the pull-out device by a simple operation of the pull-out device. Further, at the leader portion which is simply nipped from above and below, there is no need to form a large engaging concave portion (a large-diameter concave portion) as in the conventional art. Thus, the width of the leader portion can be made smaller.

In this way, the recording tape cartridge of the present invention is provided with the leader portion which is held by a pull-out device of a drive device by simple operation of the pull-out device. Further, in the recording tape cartridge, the leader portion can be made compact.

Further, the recording tape cartridge having the above-described structure may be provided with a shutter which usually closes the opening and the cut-out portions, and which opens the opening and the cut-out portions at the time when the recording tape is to be pulled out. In this structure, there is no need for the leader portion to bear the function of closing the opening, and the leader portion can be made even more compact.

Moreover, in the recording tape cartridge which is structured so as to include the shutter, the following change can be made to the leader portion. The leader portion may be structured to have a leader tape which is tightly fit to the outer peripheral surface of a reel hub of a drive device which takes up the recording tape, and a pair of upper and lower holding block portions which are provided at positions of the leader tape which project further than the transverse direction both end portions of the recording tape, and which are nipped by the pull-out device, and which can be anchored at and separated from the reel hub.

In this recording tape cartridge, when the shutter opens the opening and the cut-out portions, the pair of upper and lower holding block portions which form the leader portion are exposed from the cut-out portions. Then, the leader portion is guided to the reel hub while being nipped by the pull-out device at the pair of upper and lower holding block portions. The pair of upper and lower holding block portions are anchored at the reel hub. When the reel hub is rotated in this state, the leader tape is fit tightly to the outer peripheral surface of the reel hub, and the recording tape is wound on top of the leader tape and onto the reel hub. Because the holding block portions which are anchored at the reel hub are positioned at the transverse direction outer sides of the recording tape, they do not cause formation of a step at the take-up surface. Namely, in the present structure, the leader portion can be made to have a smaller width, and at the same time, the step arising at the recording tape take-up surface of the reel hub can be made to be smaller. The length of the leader tape may be, for example, an integer multiple of the circumference of the outer peripheral surface of the reel hub. In this case as well, the step caused by the thickness of the leader tape is absorbed.

BRIEF DESCRIPTION OF THE DRAWINGS

FIG. 12 is a perspective view showing a leader block of a conventional recording tape cartridge and a pull-out device of a drive device.

DETAILED DESCRIPTION OF THE EMBODIMENTS

A recording tape cartridge 10 relating to an embodiment of the present invention will be described hereinafter with reference to FIGS. 1 through 9. Note that, for convenience of explanation, arrow A shown in FIG. 1 as well as other figures denotes the direction of loading the recording tape cartridge 10 into a drive device 50. For convenience, this loading direction will be referred to as the front direction, and the direction of arrow B, which is orthogonal to the direction of arrow A, is the rightward direction.

Figure 1:
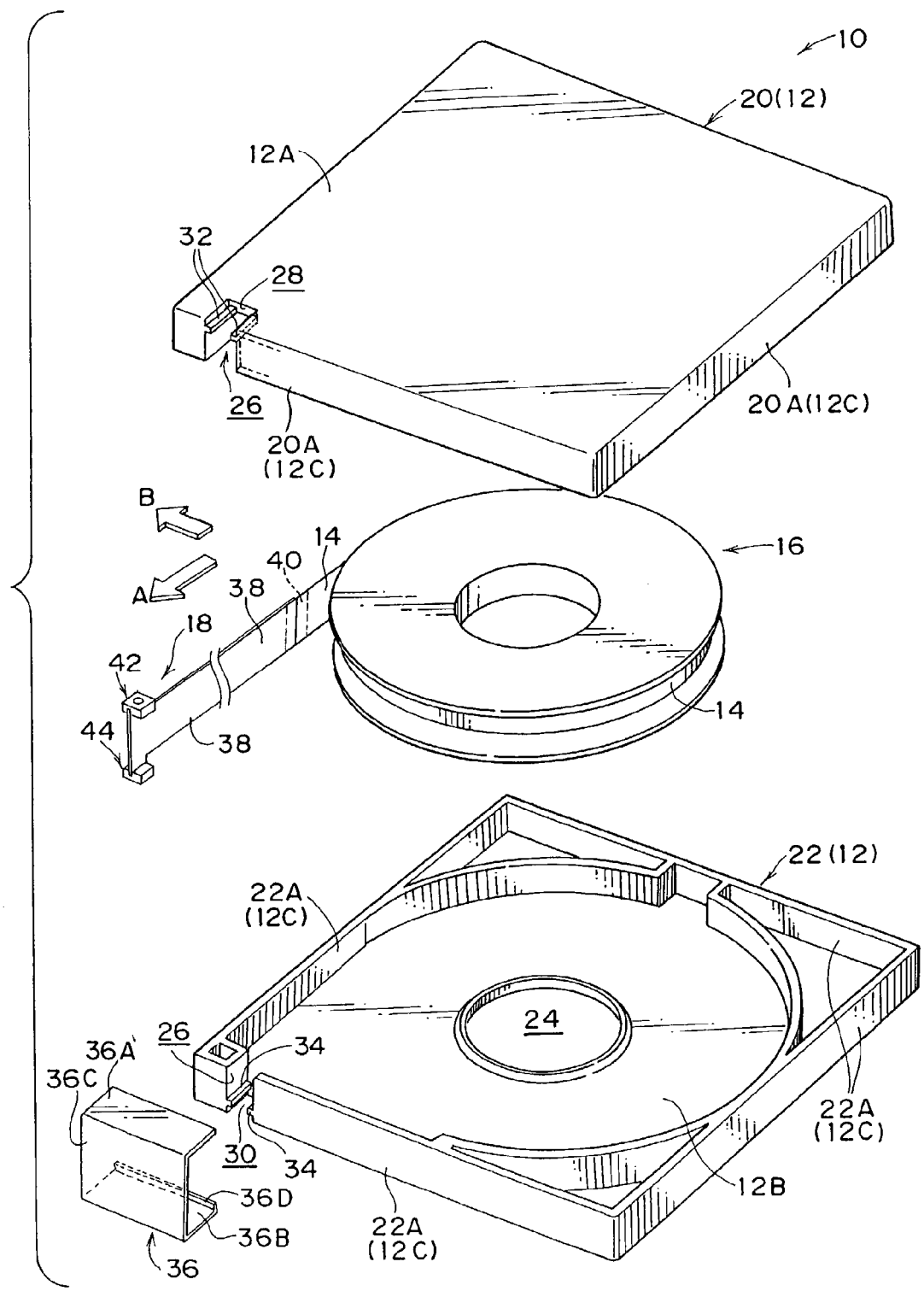
FIG. 1 is a schematic exploded perspective view of a recording tape cartridge relating to an embodiment of the present invention.
Figure 2:
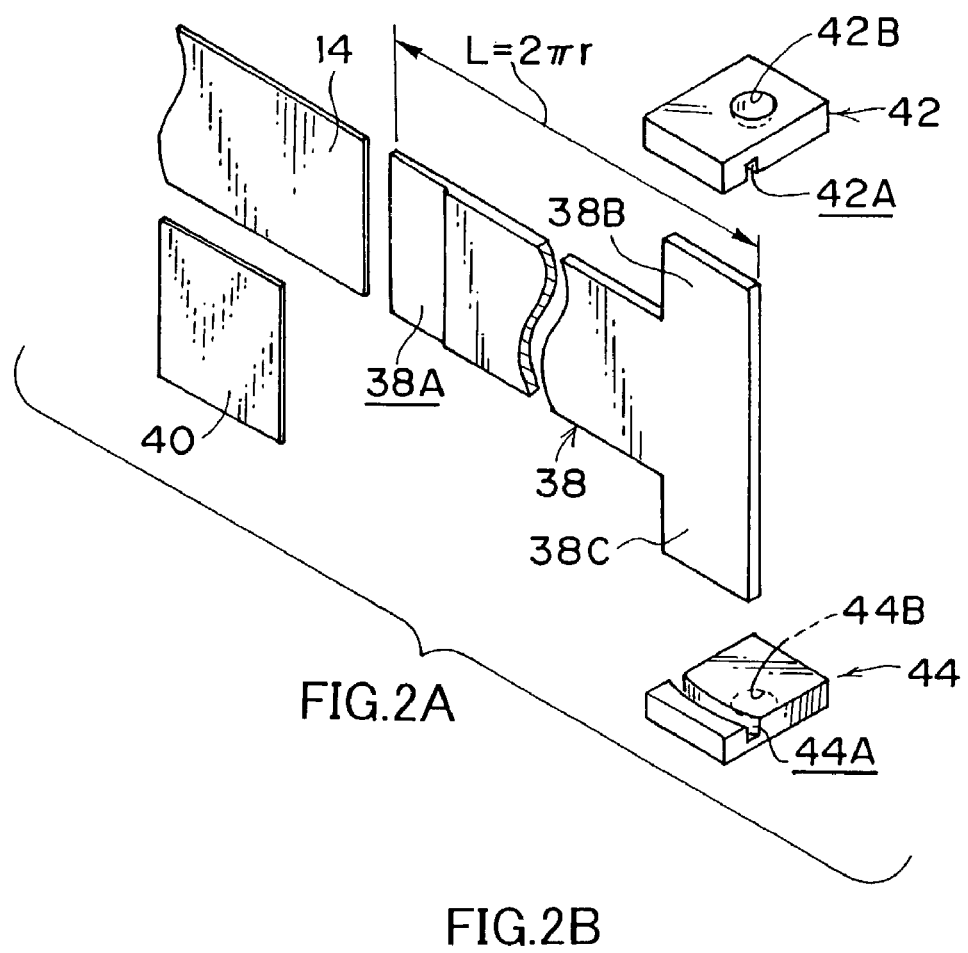
FIG. 2A is a perspective view showing a leader portion which forms the recording tape cartridge relating to the embodiment of the present invention, and showing a state before connection with a magnetic tape.
FIG. 2B is a plan view showing the leader portion which forms the recording tape cartridge relating to the embodiment of the present invention, and showing a state of connection with the magnetic tape.

The schematic overall structure of the recording tape cartridge 10 is shown in perspective view in FIG. 1. The recording tape cartridge 10 is structured such that a single reel 16, on which is wound a magnetic tape 14 serving as a recording tape which is an information recording/playback medium, is rotatably accommodated within a case 12 which is substantially rectangular in plan view. Further, a leader portion 18 is provided at the distal end of the magnetic tape 14. The structure of the leader portion 18 will be described later.

The case 12 is formed in a substantially rectangular box shape which is formed by an upper case 20 and a lower case 22 being joined together in a state in which open ends of peripheral walls 20A, 22A thereof face one another. The hollow case 12, at which a ceiling plate 12A and a bottom plate 12B which oppose one another are connected by a peripheral wall 12C, is structured in this way.

A gear opening 24, which passes through the central portion of the bottom plate 12B, is formed in the case 12. The gear opening 24 is for exposing a reel gear (not shown) of the reel 16. The reel gear of the reel 16 meshes with a driving gear of the drive device 50, such that the reel 16 is driven to rotate within the case 12.

An opening 26, which is rectangular in front view, is formed in the portion of the peripheral wall 12C which faces in the direction of arrow A at the case 12. The opening 26 allows the magnetic tape 14 to be pulled out. The opening width of the opening 26 corresponds to the width of holding blocks 42, 44 which form the leader portion 18 and which will be described later. Further, cut-out portions 28, 30, which communicate with the top and bottom of the opening 26, are formed at mutually opposing positions of the ceiling plate 12A and the bottom plate 12B of the case 12. The cut-out portions 28, 30 are for exposing the holding blocks 42, 44.

The cut-out portion 28 is formed by cutting out a portion of the ceiling plate 12A along the direction of arrow A from both left and right edge portions of the opening 26 in a substantially rectangular shape as seen in plan view. The cut-out portion 28 communicates with the top end of the opening 26. The cut-out portion 30 is formed by cutting out a portion of the bottom plate 12B along the direction of arrow A from both left and right edge portions of the opening 26 in a substantially rectangular shape as seen in plan view. The cut-out portion 30 communicates with the bottom end of the opening 26. The lengths of the cut-out portion 28, 30 along the direction of arrow A correspond to the lengths of the holding blocks 42, 44.

Pairs of left and right guide ribs 32, 34, whose longitudinal directions are along the direction of arrow A, are formed to project inwardly along the entire lengths of the cut-out portions 28, 30 at the left and right both edge portions of the cut-out portions 28, 30. The guide ribs 32, 34 are positioned so as to be slightly recessed from the outer surfaces of the ceiling plate 12A and the bottom plate 12B, respectively. The bottom ends of the guide ribs 32 and the top ends of the guide ribs 34 substantially coincide with the inner surfaces of the ceiling plate 12A and the bottom plate 12B, respectively.

Namely, the guide ribs 32, 34 are provided within the range of the thickness of the ceiling plate 12A and the bottom plate 12B, respectively. The depth from the outer surface of the ceiling plate 12A to the top surfaces of the guide ribs 32 and the depth from the outer surface of the bottom plate 12B to the bottom surfaces of the guide ribs 34 correspond to the thicknesses of the holding blocks 42, 44, respectively.

The opening 26 and the cut-out portions 28, 30 are opened and closed by a shutter 36. The shutter 36 is formed by a thin plate formed of metal or resin. The shutter 36 is formed in a substantial U-shape as seen in side view, in which a top surface closing portion 36A and a bottom surface closing portion 36B, which can slide at the ceiling plate 12A and the bottom plate 12B respectively, are connected by a front surface closing portion 36C which can slide at the peripheral wall 12C in which the opening 26 is formed.

At the shutter 36, a guide piece 36D is formed by bending the distal end of the bottom surface closing portion 36B toward the top surface closing portion 36A, substantially parallel to the front surface closing portion 36C. Due to the guide piece 36D being inserted into a guide groove (not shown) provided along the left-right direction in the outer surface of the bottom plate 12B, the shutter 36 is attached to the outer side of the case 12 so as to be able to slide in the left-right direction and such that it cannot fall off from the case 12. In this state, the upper surface closing portion 36A, the bottom surface closing portion 36B, and the front surface closing portion 36C slidingly contact the ceiling plate 12A, the bottom plate 12B and the peripheral wall 12C, respectively.

Usually (i.e., when the recording tape cartridge 10 is not in use, such as when the recording tape cartridge 10 is being stored or transported), the shutter 36 is positioned at a closed position (see FIG. 3) at which the upper surface closing portion 36A, the bottom surface closing portion 36B, and the front surface closing portion 36C close the cut-out portions 28, 30 and the opening 26, respectively. Specifically, when the shutter 36 is positioned at the closed position, movement of the shutter 36 in the left-right direction is regulated by an unillustrated locking means, or the shutter 36 is held at the closed position by the urging force of an unillustrated urging means such as a coil spring or a torsion spring.

When the recording tape cartridge 10 is loaded into the drive device 50 at the time when the recording tape cartridge 10 is to be used, accompanying this loading operation, the locked state of the locking means is released, and the shutter 36 is slid toward the left by an unillustrated opening/closing means of the drive device 50 against the urging force of the urging means. The shutter 36 thereby moves to an open position (see FIG. 4) at which the cut-out portions 28, 30 and the opening 26 are open.

Next, the leader portion 18 will be described. As shown in detail in FIGS. 2A and 2B, a leader tape 38 having the same width as the magnetic tape 14 (in the present embodiment, the leader tape 38 is 12.7 mm wide) is connected to the distal end of the magnetic tape 14.

The leader tape 38 is formed in a tape-like shape from a thin metal film of aluminum (an alloy) or stainless steel or the like, in order to ensure strength against the nipping force of a guiding mechanism 70 which will be described later. The width and the tolerance of the leader tape 38 are 0.1 mm±5 μm. In this way, in the longitudinal direction, the leader tape 38 can easily curvingly deform in the thickness direction, and in the transverse direction, it is difficult for the leader tape 38 to deform in the thickness direction. Note that, in the structure relating to the present embodiment in which the magnetic tape 14 is employed as the recording tape, the material of the leader tape 38 is preferably aluminum which is not magnetic.

The length of the leader tape 38 corresponds to the length of the circumference of a reel hub 60 (which will be described later) of the drive device 50. Namely, given that the radius of the reel hub 60 is r, the length L of the leader tape 38 is 2 πr.

A concave portion 38A is formed along the entire width at a portion, at one end of the leader tape 38, which portion is at the outer side in the state in which the leader tape 38 is wound on the reel hub 60. A splice tape 40, which is an adhesive (pressure-sensitive) tape of the same width as the magnetic tape 14 and the leader tape 38, is adhered to the concave portion 38A. The splice tape 40 is adhered to the distal end of the magnetic tape 14 as well. In this way, the magnetic tape 14 and the leader tape 38 are connected via the splice tape 40 in a state in which the longitudinal directions of the magnetic tape 14 and the leader tape 38 coincide.

Note that the depth of the concave portion 38A corresponds to the thickness of the splice tape 40 (from 15 μm to 30 μm), and, in the above-described connected state, the surface of the leader tape 38 (the surface at the outer side in the aforementioned wound state) and the surface of the splice tape 40 are substantially flush with one another (see FIG. 2B). The thickness of the magnetic tape 14 is from 6 μm to 20 μm.

A pair of upper and lower attaching pieces 38B, 38C, which are each formed in a substantially rectangular shape, extend from both transverse direction end portions of the other end portion of the leader tape 38 (i.e., the free end portion at the side opposite the side connected to the magnetic tape 14) toward the outer sides in the transverse direction. The holding blocks 42, 44 are attached to these attaching pieces 38B, 38C.

Each of the holding blocks 42, 44 is formed in the shape of a small block having a substantially rectangular configuration. In the state in which distal ends of the attaching pieces 38B, 38C are inserted in holding grooves 42A, 44A of the holding blocks 42, 44, the holding blocks 42, 44 are attached by being adhered or the like to the attaching pieces 38B, 38C. The depths of the holding grooves 42A, 44A are respectively set to be slightly smaller than the projecting heights (the lengths of projection from the leader tape 38) of the attaching pieces 38B, 38C. In this way, the interval over which the holding blocks 42, 44 oppose one another is made to be greater than the width of the magnetic tape 14. Namely, the holding blocks 42, 44 are positioned at the widthwise direction outer sides of the widthwise direction end portions of the magnetic tape 14.

The holding grooves 42A, 44A are offset in the transverse direction such that, in the above-described attached state, the amounts of projection of the holding blocks 42, 44 toward the outer surface side in the aforementioned wound state of the leader tape 38 are smaller than the amounts of projection toward the inner surface side. The holding grooves 42A, 44A are formed in circular arc shapes, in plan view, which are convex toward the aforementioned outer surface side in correspondence with the outer peripheral surface of the reel hub 60. In this way, the distal end portion of the leader tape 38 (the region at which the attaching pieces 38B, 38C are provided) is curvingly-deformed in a circular arc shape in correspondence with the outer peripheral surface of the reel hub 60.

Engaging concave portions 42B, 44B, which are respectively round in plan view, are provided at the portions of the holding blocks 42, 44 which portions project toward the inner surface side of the leader tape 38 in the aforementioned wound state. The engaging concave portion 42B is open upwardly, and the engaging concave portion 44B is open downwardly.

The holding blocks 42, 44 may be formed of a highly rigid material such as metal or an engineering plastic or the like, or may be formed of an elastic material such as rubber or resin or the like in order to permit the curving-deformation of the free end portion of the leader tape 38. In this case, the curvature of the holding grooves 42A, 44A is formed such that the curvature of the free end portion of the leader tape 38 in the free state is slightly smaller than the curvature of the outer surface of the reel hub 60.

The above-described leader tape 38 and holding blocks 42, 44 form the leader portion 18. The leader portion 18 can be attached to and removed from the case 12. Specifically, in the state in which the holding block 42 slidably contacts the entire lengths of the top surfaces of the guide ribs 32 within the cut-out portion 28 and the holding block 44 slidably contacts the entire lengths of the bottom surfaces of the guide ribs 34 within the cut-out portion 30, the leader portion 18 is held at the case 12 so as to be unable to drop off therefrom due to the shutter 36 being positioned at the closed position.

When the shutter 36 moves to the open position, the leader portion 18 can separate from the case 12 along the direction of arrow A while the holding blocks 42, 44 are guided by the cut-out portions 28, 30 which have widths corresponding to the widths of the holding blocks 42, 44. In this state, the leader portion 18 is pulled-out in the direction of arrow A while being nipped at the holding blocks 42, 44 from above and below by the guiding mechanism 70 of the drive device 50 which will be described later.

Next, the drive device 50 into which the recording tape cartridge 10, which has the above-described structure, is loaded will be described. As shown in schematic perspective view in FIG. 8, the drive device 50 has, on a base portion 52 thereof, a cartridge accommodating portion 54 at which the recording tape cartridge 10 is accommodated. Positioning stand portions 56 are provided at the cartridge accommodating portion 54.

The positioning stand portions 56 are the references for vertical direction positioning and horizontal direction positioning of the recording tape cartridge 10 within the drive device 50, and are provided so as to project from the base portion 52. The positioning stand portions 56 thereby hold the recording tape cartridge 10 such that the cut-out portions 28, 30 can be accessed from above and below. Specifically, the recording tape cartridge 10 is placed on an unillustrated bucket and is loaded into the cartridge accommodating portion 54 along the direction of arrow A. Due to the recording tape cartridge 10 moving downwardly together with the bucket, the recording tape cartridge 10 is positioned on the positioning stand portions 56 in a state in which the cut-out portions 28, 30 are exposed upwardly and downwardly.

Figure 6:
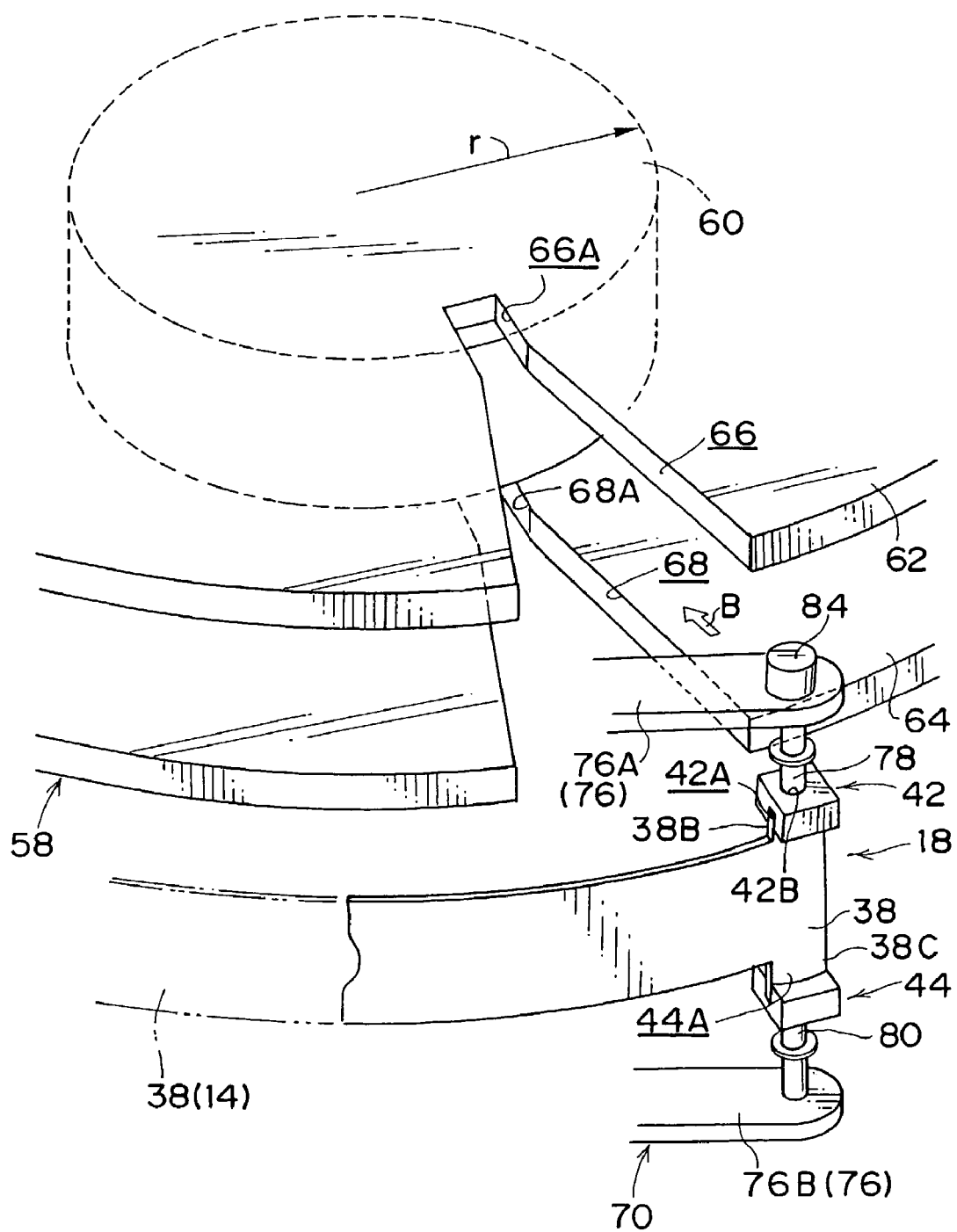
FIG. 6 is a perspective view showing the leader portion of the recording tape partridge relating to the present invention and a take-up reel of a drive device which the leader portion is anchored.

Further, the drive device 50 is provided with a take-up reel 58 which rotates and takes-up the magnetic tape 14. As shown in FIG. 6 as well, the take-up reel 58 is formed to include a reel hub 60, an upper flange 62, and a lower flange 64. The reel hub 60 is circular as seen in plan view (is a circle having radius r), and the height thereof (the axial direction length thereof) is slightly larger than the width of the magnetic tape 14. The upper flange 62 and the lower flange 64 are coaxially fixed to the axial (top-bottom) direction end portions of the reel hub 60.

Slits 66, 68, which extend from the outer edges of the upper flange 62 and the lower flange 64 to further inwardly than the outer peripheral surface of the reel hub 60, are provided in the upper flange 62 and the lower flange 64 at positions opposing each other. Each of the slits 66, 68 is formed in a taper shape which becomes wider toward the radial direction outer side. A straight portion, at which the slit walls are parallel, is formed at the reel hub 60 side (the inner end side) of each slit 66, 68. The straight portions form fit-together portions 66A, 68A at which the intervals over which the slit walls oppose one another correspond to the lengths of the holding blocks 42, 44, and at which the holding blocks 42, 44 can be engaged and from which the holding blocks 42, 44 can be removed.

Namely, the holding blocks 42, 44, which, while making the leader tape 38 oppose the outer peripheral surface of the reel hub 60, pass through the slits 66, 68 and move along the radial direction of the reel hub 60 (the direction of arrow B), fit-together with and are held at the fit-together portions 66A, 68A. This held state is cancelled by the holding blocks 42, 44, which are fit-together and held as described above, moving outwardly in the radial direction. In the state in which the holding blocks 42, 44 are fit-together with the fit-together portions 66A, 68A, the free end portion of the leader tape 38 (the region at which the attaching pieces 38B, 38C are provided) is fit tightly to the outer peripheral surface of the reel hub 60.

In the initial state, the take-up reel 58 is held at a position, in the direction of rotation, at which the slits 66, 68 face the direction opposite to the direction of arrow B.

The drive device 50 has the guiding mechanism 70, which serves as a pull-out means, for guiding to the take-up reel 58 the leader portion 18 of the recording tape cartridge 10 accommodated in the cartridge accommodating portion 54. The guiding mechanism 70 has a first arm 74 which is rotated by a driving portion 72 in the direction of arrow C and in the direction of arrow D which is opposite to the direction of arrow C. One end portion of a second arm 76 is connected to the distal end of the first arm 74 so as to be swingable along the base portion 52 (along a horizontal plane).

An unillustrated torsion spring is disposed at the portion where the first arm 74 and the second arm 76 are connected. The second arm 76 is urged, with respect to the first arm 74, in the direction of arrow E (in the direction in which a guide pin 84, which will be described later, abuts a cam surface 82A).

The second arm 76 has an upper arm 76A and a lower arm 76B. An extending/contracting pin 78, which extends and contracts in the vertical direction, is provided at the distal end of the upper arm 76A so as to be directed downward. The distal end of the extending/contracting pin 78 can be inserted into the engaging concave portion 42B of the holding block 42. A fixing pin 80 is provided at the distal end of the lower arm 76B so as to be directed upwardly and so as to be coaxial with the extending/contracting pin 78. The distal end of the fixing pin 80 can be inserted into the engaging concave portion 44B of the holding block 44.

At the guiding mechanism 70, the distal end of the fixing pin 80 is inserted into the engaging concave portion 44B due to the bucket being lowered. At this time, the extending/contracting pin 78 contracts so as to not interfere with movement of the bucket in the direction of arrow A. Then, when the distal end of the fixing pin 80 is inserted into the engaging concave portion 44B, the extending/contracting pin 78 is extended such that the distal end thereof is inserted into the engaging concave portion 42B. Namely, the guiding mechanism 70 nips the leader portion 18 from the top and bottom (at the holding blocks 42, 44), between the extending/contracting pin 78 and the fixing pin 80.

The respective distal ends of the extending/contracting pin 78 and the fixing pin 80 are rounded, and substantially point-contact the bottom portions of the engaging concave portions 42B, 44B of the holding blocks 42, 44. In this way, there is little resistance accompanying variations in the posture of the leader portion 18 with respect to the second arm 76 which is in the above-described nipping state. In addition, the leader portion 18 can be prevented from coming out from between the extending/contracting pin 78 and the fixing pin 80.

Figure 8:
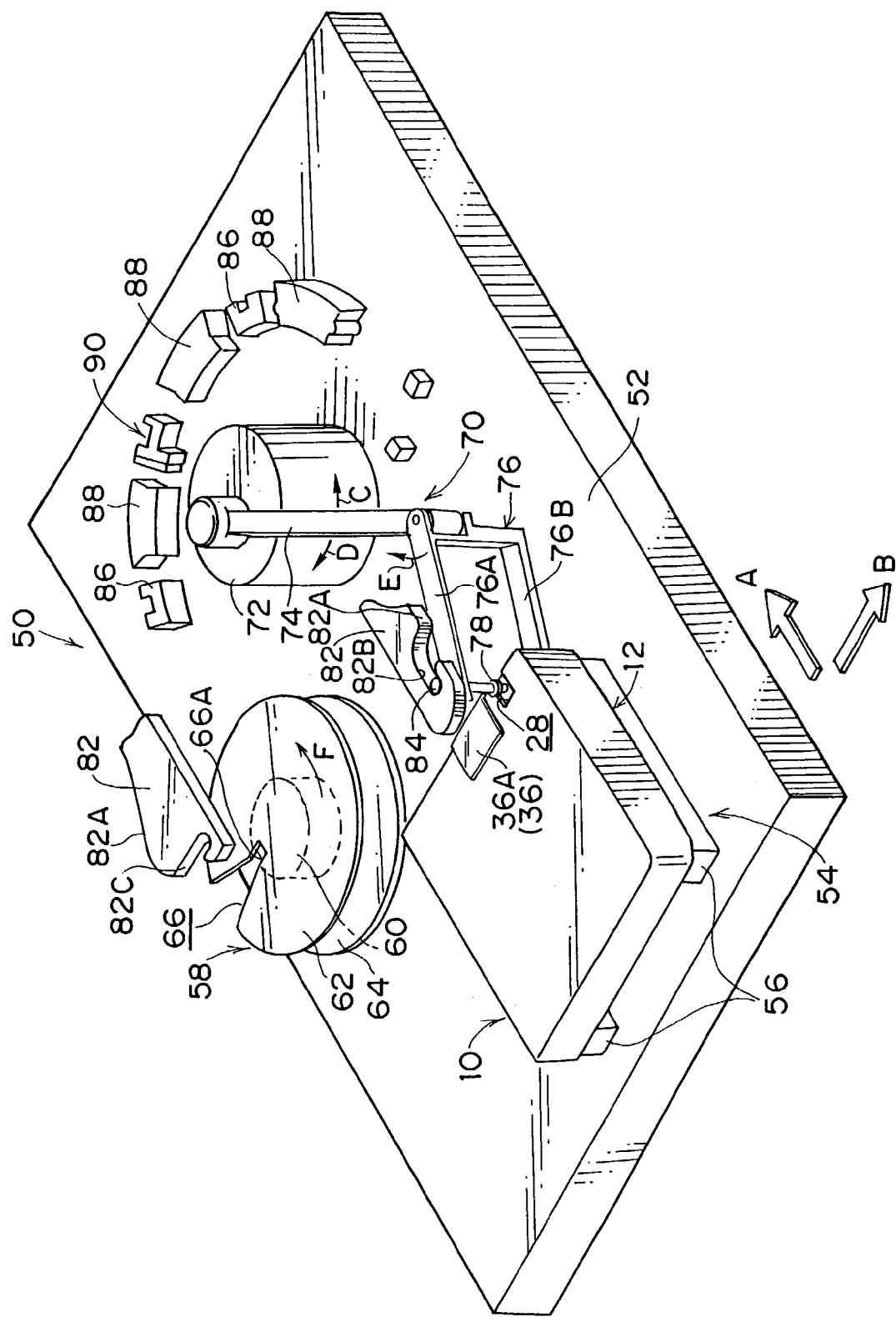
FIG. 8 is a perspective view showing the schematic structure of the drive device in which the recording tape cartridge relating to the embodiment of the present invention is loaded.
Figure 9:
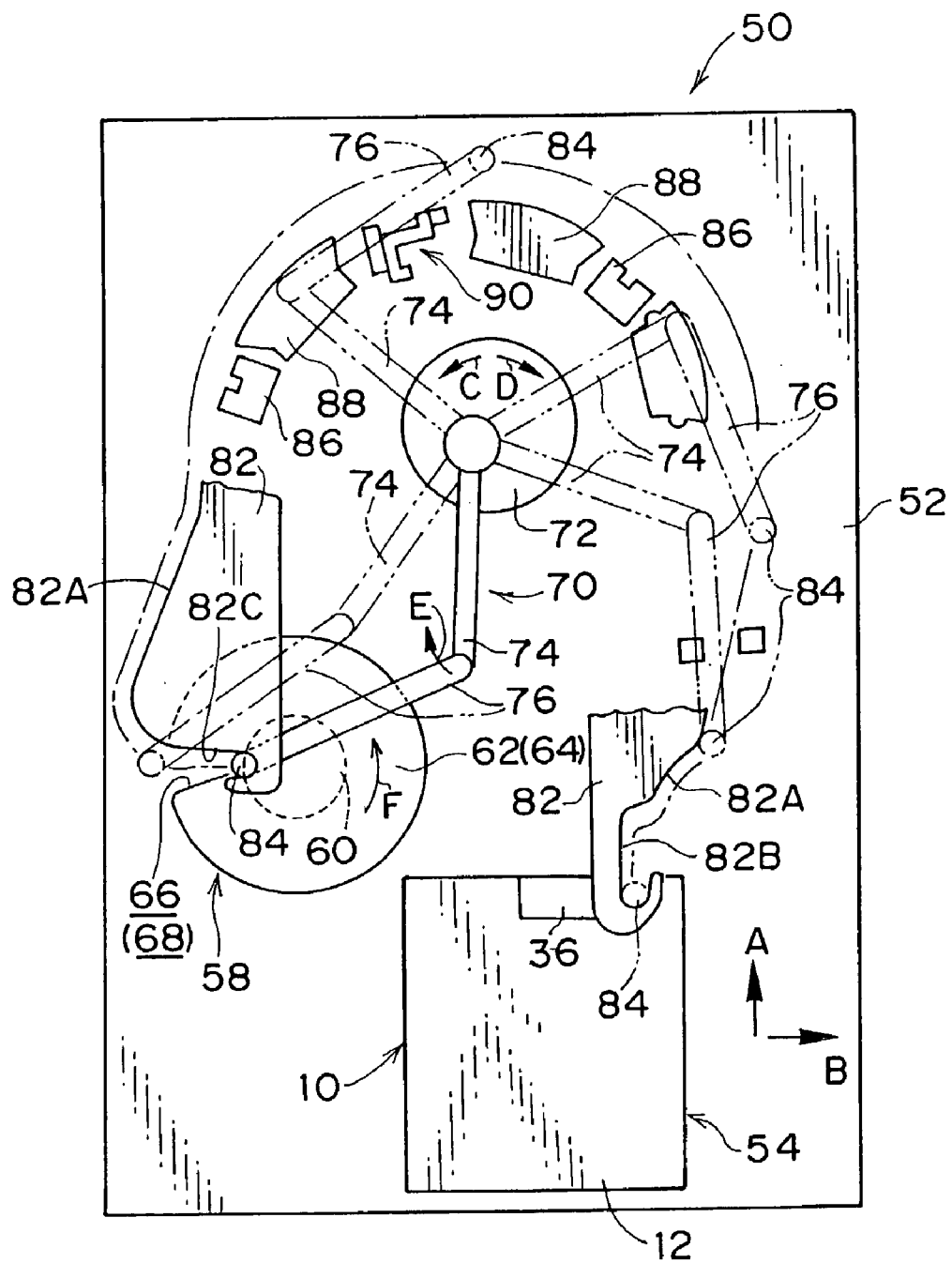
FIG. 9 is a plan view showing the schematic structure of the drive device in which the recording tape cartridge relating to the embodiment of the present invention is loaded.

The guiding mechanism 70 is provided with a cam plate 82, portions of which are shown in FIGS. 8 and 9. A cam surface 82A is formed at the cam plate 82. The cam surface 82A is abutted by a guide pin 84 which projects from the top surface of the upper arm 76A which is urged in the direction of arrow E by the urging force of the aforementioned torsion spring. As shown in FIG. 9, the cam surface 82A is formed so as to be suitably curved such that the distal end of the second arm 76 moves substantially along a predetermined tape path.

At the cam surface 82A, a recording tape cartridge 10 side proximal end 82B is formed to be rectilinear along the direction of arrow A (in the direction in which the leader portion 18 separates form the case 12), and the winding reel 58 side final end 82C is formed to be rectilinear along the direction of arrow B (the direction in which the holding blocks 42, 44 forming the leader portion 18 are fit-together with the fit-together portions 66A, 68A).

Moreover, the drive device 50 has a plurality of tape guides 86 and cleaners 88 which prescribe the aforementioned predetermined tape path. A recording/playback head 90, which is for recording information onto the magnetic tape 14 and for playing back information recorded on the magnetic tape 14, is disposed along this predetermined tape path.

Next, operation of the present embodiment will be described.

Figure 3:
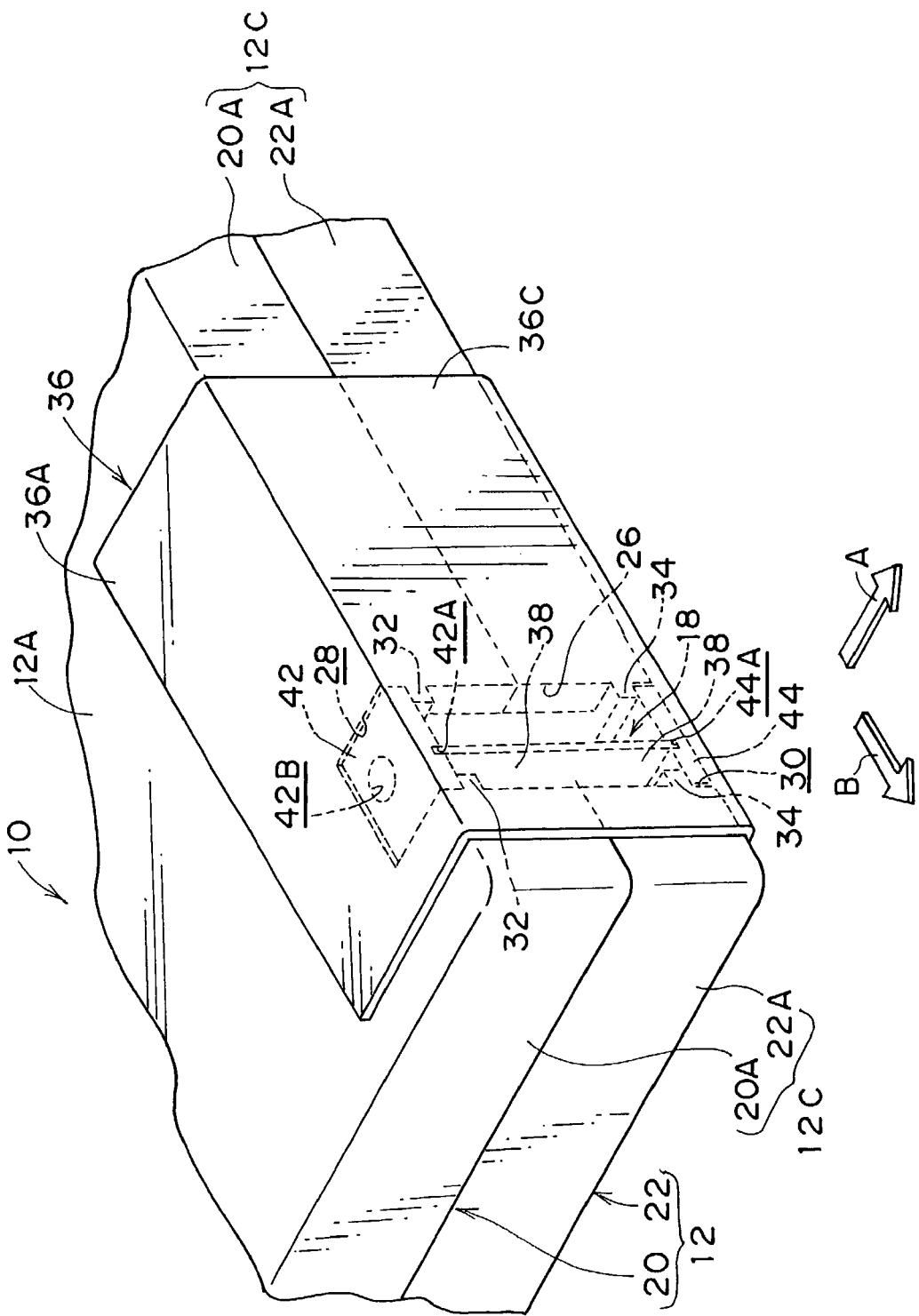
FIG. 3 is a perspective view showing a state in which the leader portion is held at a case at a time when the recording tape cartridge relating to the embodiment of the present invention is not in use.
Figure 4:
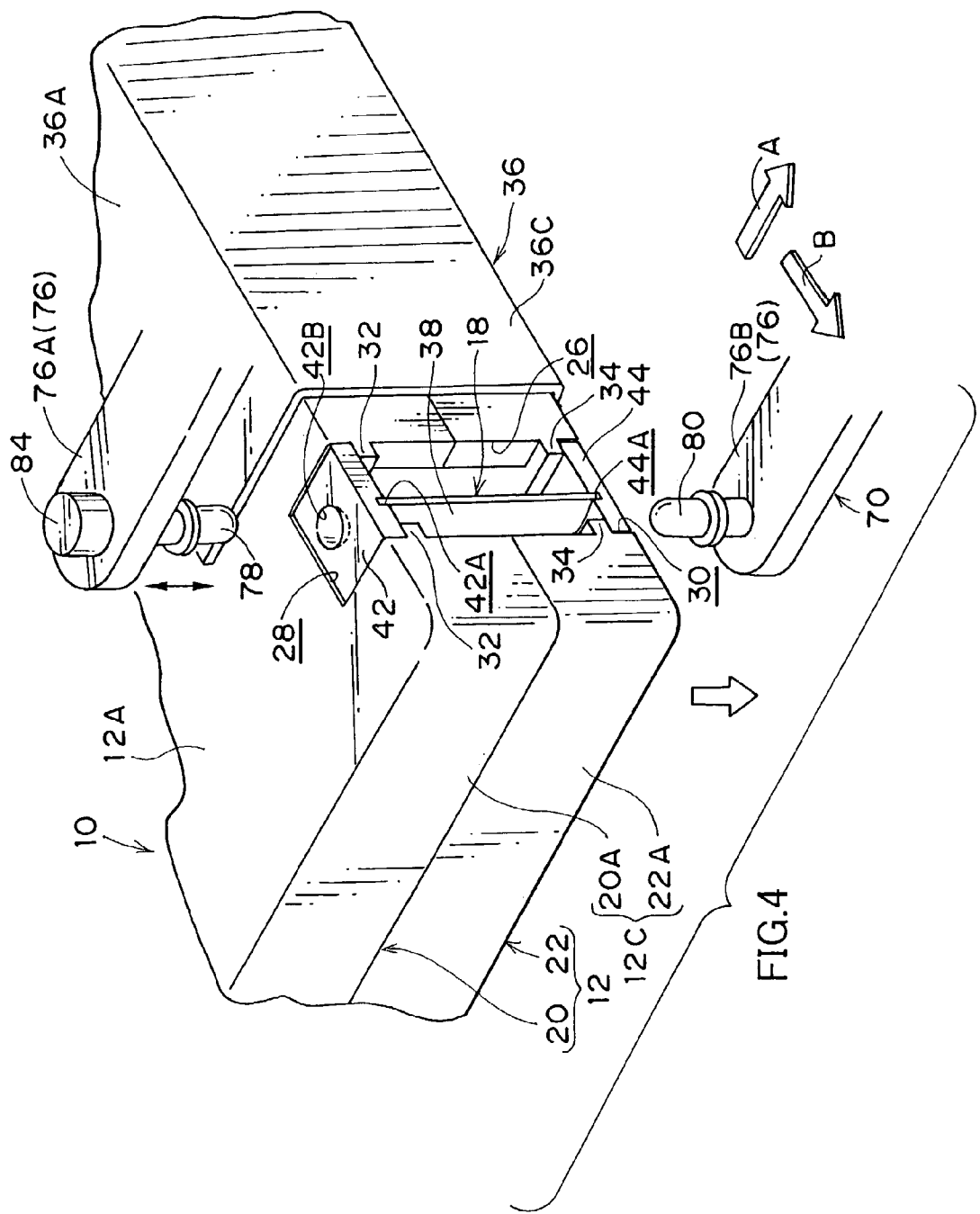
FIG. 4 is a perspective view showing a state in which a guiding mechanism can access the leader portion of the recording tape cartridge relating to the embodiment of the present invention.

In the recording tape cartridge 10 having the above-described structure, when the recording tape cartridge 10 is not being used (such as, is being stored or transported), the leader portion 18 is held within the case 12. Namely, as shown in FIG. 3, in the state in which the holding blocks 42, 44 are disposed within the cut-out portions 28, 30 respectively, the cut-out portions 28, 30 and the opening 26 are closed by the shutter 36. In this way, the leader portion 18 can be impeded from dropping out from the case 12, and dust and the like can be impeded from entering into the case 12.

When the recording tape cartridge 10 is to be used, i.e., when information is to be recorded onto the magnetic tape 14 or information recorded on the magnetic tape 14 is to be played back, the recording tape cartridge 10 is loaded into the bucket of the drive device 50 along the direction of arrow A.

Accompanying this loading operation or further movement of the bucket in the direction of arrow A, the shutter 36 is slid to the left such that the opening 26 and the cut-out portions 28, 30 are opened. Namely, the leader portion 18 is set in a state (FIG. 4) in which it can be separated from the case 12, and the holding blocks 42, 44 of the leader portion 18 are exposed from the cut-out portions 28, 30 such that the holding blocks 42, 44 can be accessed by the guiding mechanism 70.

Next, the recording tape cartridge 10 and the bucket are lowered. Accompanying this lowering, the recording tape cartridge 10 is placed on the positioning stand portions 56 and positioned in the vertical direction while being positioned in the horizontal direction. Further, due to this lowering, the distal end of the fixing pin 80 of the guiding mechanism 70 enters into the engaging concave portion 44B of the holding block 44. The distal end of the fixing pin 80 abuts the bottom of the engaging concave portion 44B.

Then, the extending/contracting pin 78 of the guiding mechanism 70 extends downwardly and enters into the engaging concave portion 42B of the holding block 42 (the distal end of the extending/contracting pin 78 abuts the bottom of the engaging concave portion 42B). In this way, the leader portion 18 is, at the holding blocks 42, 44, nipped from above and below between the extending/contracting pin 78 and the fixing pin 80, and is held by the guiding mechanism 70.

Figure 5:
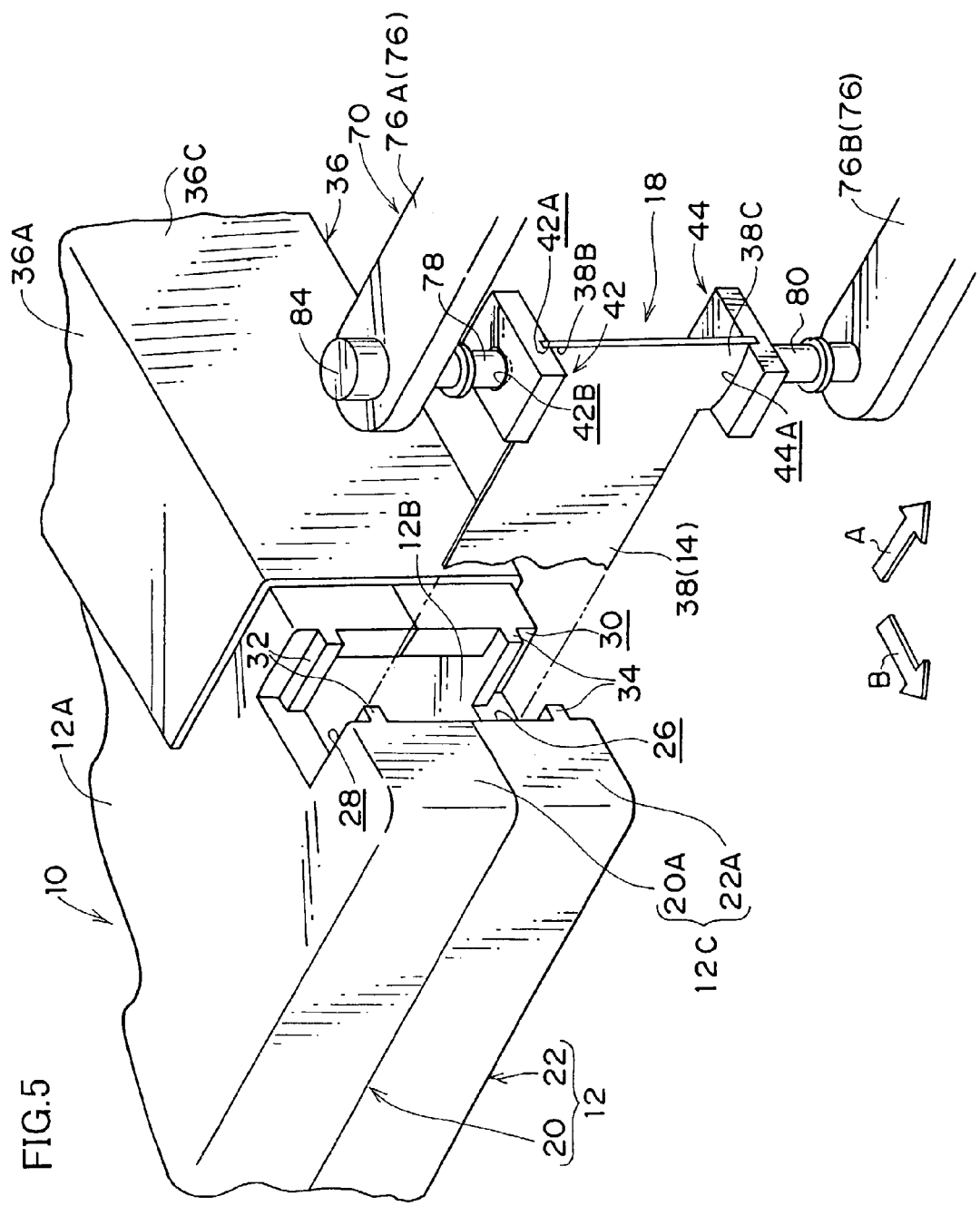
FIG. 5 is a perspective view showing a state in which the leader portion of the recording tape cartridge relating to the embodiment of the present invention has been separated from the case by the guiding mechanism.

In this state, when the driving portion 72 of the guiding mechanism 70 rotates the first arm 74 in the direction of arrow C, the second arm 76 is swung while being guided, at the guide pin 84, by the cam surface 82A of the cam plate 82. Then, first, due to the guide pin 84 being guided by the proximal end 82B of the cam surface 82A, the extending/contracting pin 78 and the fixing pin 80 move in the direction of arrow A and separate the leader portion 18 from the case 12 (FIG. 5).

The first arm 74 is rotated further, and the extending/contracting pin 78 and the fixing pin 80 move substantially along the predetermined tape path. When the guide pin 84 reaches the final end 82C, the guide pin 84 moves in the direction of arrow B while being guided by the final end 82C. Namely, the leader portion 18 approaches the outer peripheral surface of the reel hub 60 while the leader tape 38 is made to oppose the outer peripheral surface of the reel hub 60 (FIG. 6).

Then, the holding blocks 42, 44 of the leader portion 18 pass through the slits 66, 68, reach the fit-together portions 66A, 68A, and are fit-together with and engage (i.e., are anchored at) the fit-together portions 66A, 68A. In this way, the free end portion of the leader tape 38 is fit tightly to the outer peripheral surface of the reel hub 60. In this state, when the take-up reel 58 is rotated in the direction of arrow F shown in FIGS. 7 through 9 synchronously with the reel 16, the leader tape 38 is trained around and fit tightly to the reel hub 60 while being curvingly-deformed in the thickness direction along the outer peripheral surface of the reel hub 60.

Figure 7A:
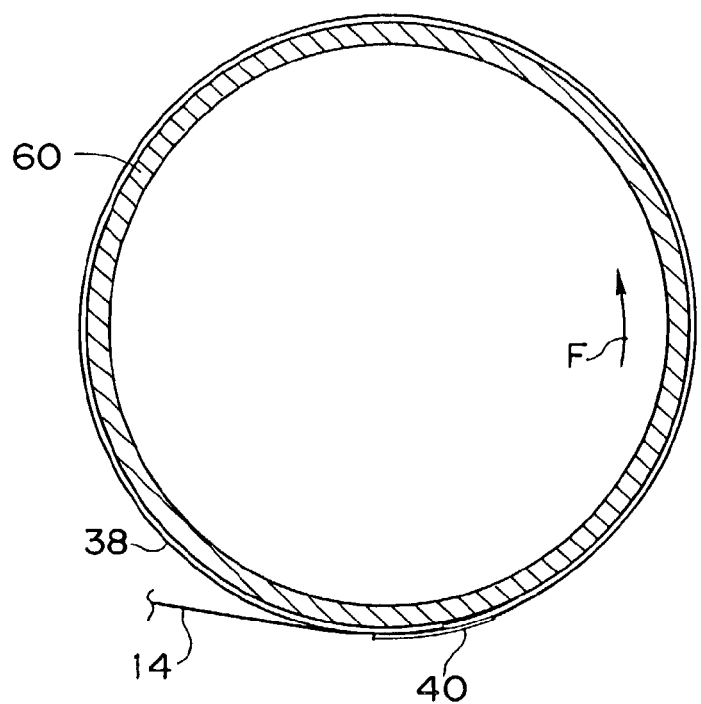
FIG. 7A is a plan sectional view showing a state in which the magnetic tape of the recording tape cartridge relating to the embodiment of the present invention is taken-up on the take-up reel of the drive device.
Figure 7B:
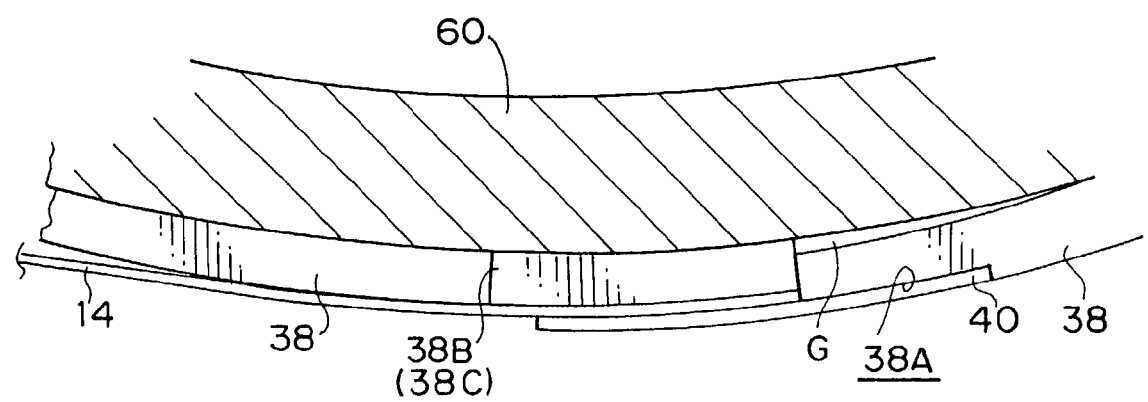
FIG. 7B is an enlarged sectional view of main portions showing the state in which the magnetic tape of the recording tape cartridge relating to the embodiment of the present invention is taken-up on the take-up reel of the drive device.

When the leader tape 38 has been wound once around the reel hub 60, the take-up surface is formed by the leader tape 38. By rotating the take-up reel 58 further in the direction of arrow F, the magnetic tape 14 is taken-upon to this take-up surface (FIG. 7A). At this time, as shown in FIG. 7B, a slight gap G (which is, at maximum, equal to the sum of the thicknesses of the magnetic tape 14 and the splice tape 40) is formed between the outer surface of the reel hub 60 and the end portion of the leader tape 38 which end portion is connected to the magnetic tape 14.

Then, by making the longitudinal direction both end portions of the leader tape 38 coincide at the peripheral direction of the reel hub 60, the thickness of the leader tape 38 is adsorbed. Thus, at the take-up surface on which the magnetic tape 14 is taken up, only a minute step is formed by the thickness of the splice tape 40, and the take-up surface is in an extremely smooth state. Folds do not arise in the magnetic tape 14, nor does the magnetic tape 14 deform.

When the take-up reel 58 and the reel 16 are rotated further, the magnetic tape 14 is successively pulled out from the case 12 while being taken-up onto the aforementioned take-up surface (i.e., the reel hub 60). Information is recorded or recorded information is played back by the recording/playback head (magnetic head) 90 disposed along the aforementioned predetermined tape path.

After the magnetic tape 14 has been used, the magnetic tape 14 is rewound onto the reel 16 by driving the take-up reel 58 and the reel 16 to rotate reversely. Then, due to the guiding mechanism 70 pivoting the first arm 74 in the direction of arrow D, operations which are substantially opposite to those of the above-described case in which the magnetic tape 14 is to be used are carried out, and the leader portion 18 is accommodated into the case 12 (is returned to its initial position).

Further, due to the extending/contracting pin 78 contracting, the state in which the leader portion 18 is nipped by the guiding mechanism 70 is cancelled. Thereafter, the bucket is raised, and the fixing pin 80 comes out from the engaging concave portion 44B. Then, when the bucket is moved in the direction opposite to the direction of arrow A and the recording tape cartridge 10 is discharged, accompanying this operation, the shutter 36 returns to its initial position. Namely, the opening 26 and the cut-out portions 28, 30 are closed, and the recording tape cartridge 10 returns to the aforementioned state of non-use.

Here, when the magnetic tape 14 is pulled out from the case 12, the leader portion 18 is merely nipped from above and below by the guiding mechanism 70 at the holding blocks 42, 44 which are exposed at the exterior of the case 12. Thus, the guiding mechanism 70 can hold the leader portion 18 by the simple operation of the guiding mechanism 70 extending the extending/contracting pin 78.

The leader portion 18, which is being held merely by being nipped from above and below, does not need to have a large-sized engaging concave portion as in the conventional art, and the widths of the holding blocks 42, 44 can be made to be small. Further, the take-up surface of the magnetic tape 14 is formed by the leader tape 38 being trained on the outer peripheral surface of the reel hub 60, and there is no portion of the leader portion 18 which enters within the reel hub 60. Therefore, the dimensions of the holding blocks 42, 44 do not depend on the dimensions of the reel hub 60, and the leader tape 38 can be made small on the whole.

In this way, in the recording tape cartridge 10 relating to the present embodiment, the leader portion 18 is held between the extending/contracting pin 78 and the fixing pin 80 of the guiding mechanism 70 by the simple operation of the guiding mechanism 70 of the drive device 50, and the leader portion 18 can be made small.

Further, the shutter 36, which opens and closes the opening 26 and the cut-out portions 28, 30, is provided at the magnetic tape cartridge 10. Therefore, there is no need for the leader portion 18 to bear the function of closing the opening 26 and the like, and the leader portion 18 can be made more small. Further, due to the shutter 36, it is possible to reliably impede the leader portion 18 from falling out from the case 12. Thus, even when the recording tape cartridge 10 is dropped, the state in which the leader portion 18 is positioned and held at the case 12 is maintained.

As described above, because the leader portion 18 does not enter into the reel hub 60, there is no need to provide, at the outer peripheral surface of the reel hub 60, an indentation or projection (a hole or a projection for anchoring) which would be a cause of formation of a step. Further, in the state in which the holding blocks 42, 44 of the leader portion 18 are fit-together and held at the fit-together portions 66A, 68A of the take-up reel 58 at the outer sides of the transverse direction end portions of the magnetic tape 14, the take-up surface of the magnetic tape 14 is formed by the leader tape 38 being fit tightly to the outer peripheral surface of the reel hub 60 along substantially one winding therearound. Therefore, the step at the take-up surface is extremely small.

In the above-described embodiment, the recording tape cartridge 10 is provided with the leader portion 18 which is formed by the leader tape 38 and the holding blocks 42, 44. However, the present invention is not limited to the same, and, for example, the structure relating to the modified example shown in FIGS. 10 and 11 may be used. This modified example will be described hereinafter. Parts and portions which are basically the same as those of the above-described embodiment are denoted by the same reference numerals as in the above-described embodiment, and description thereof is omitted.

Figure 10:
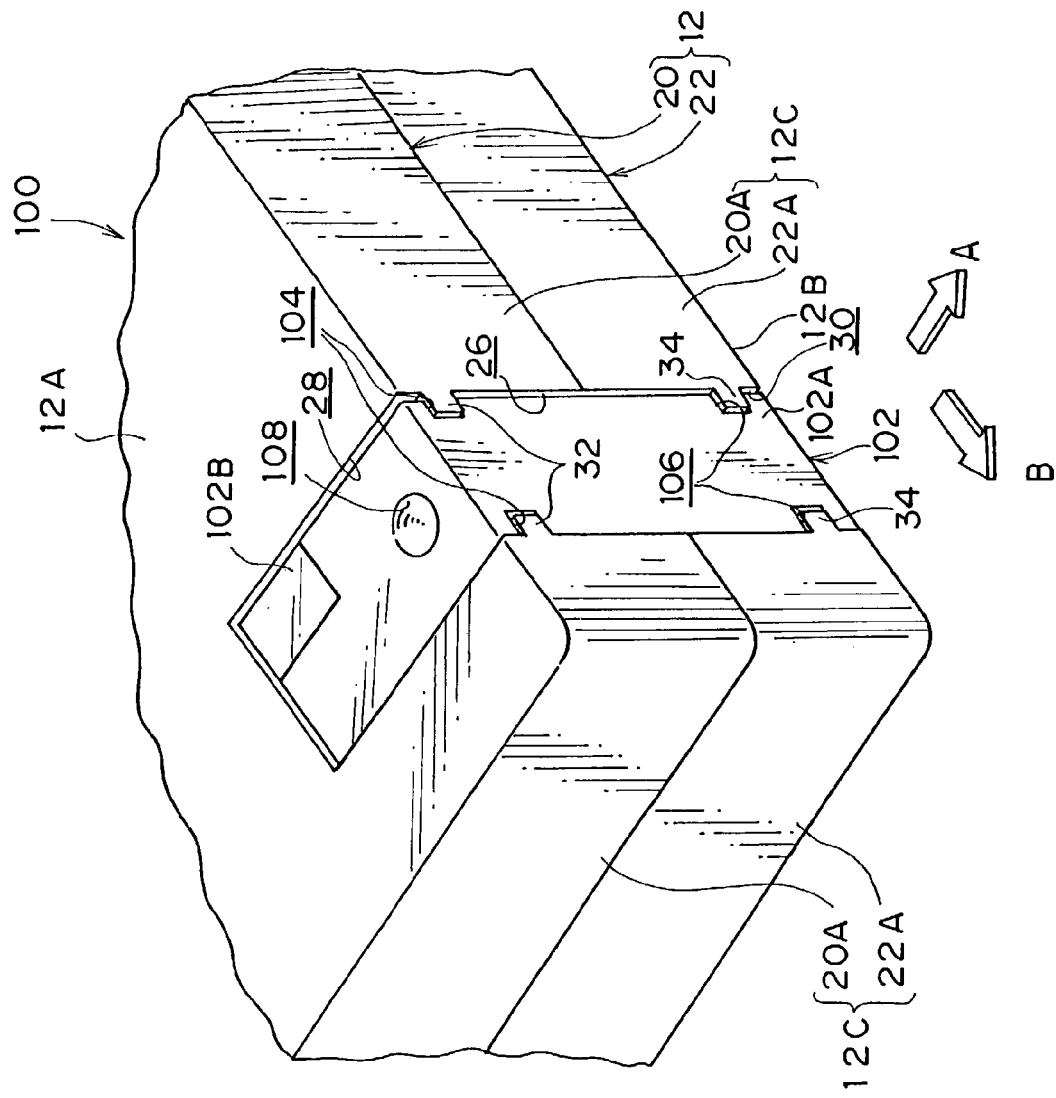
FIG. 10 is a perspective view corresponding to FIG. 3 and illustrating a modified example of the recording tape cartridge relating to the embodiment of the present invention.
Figure 11:
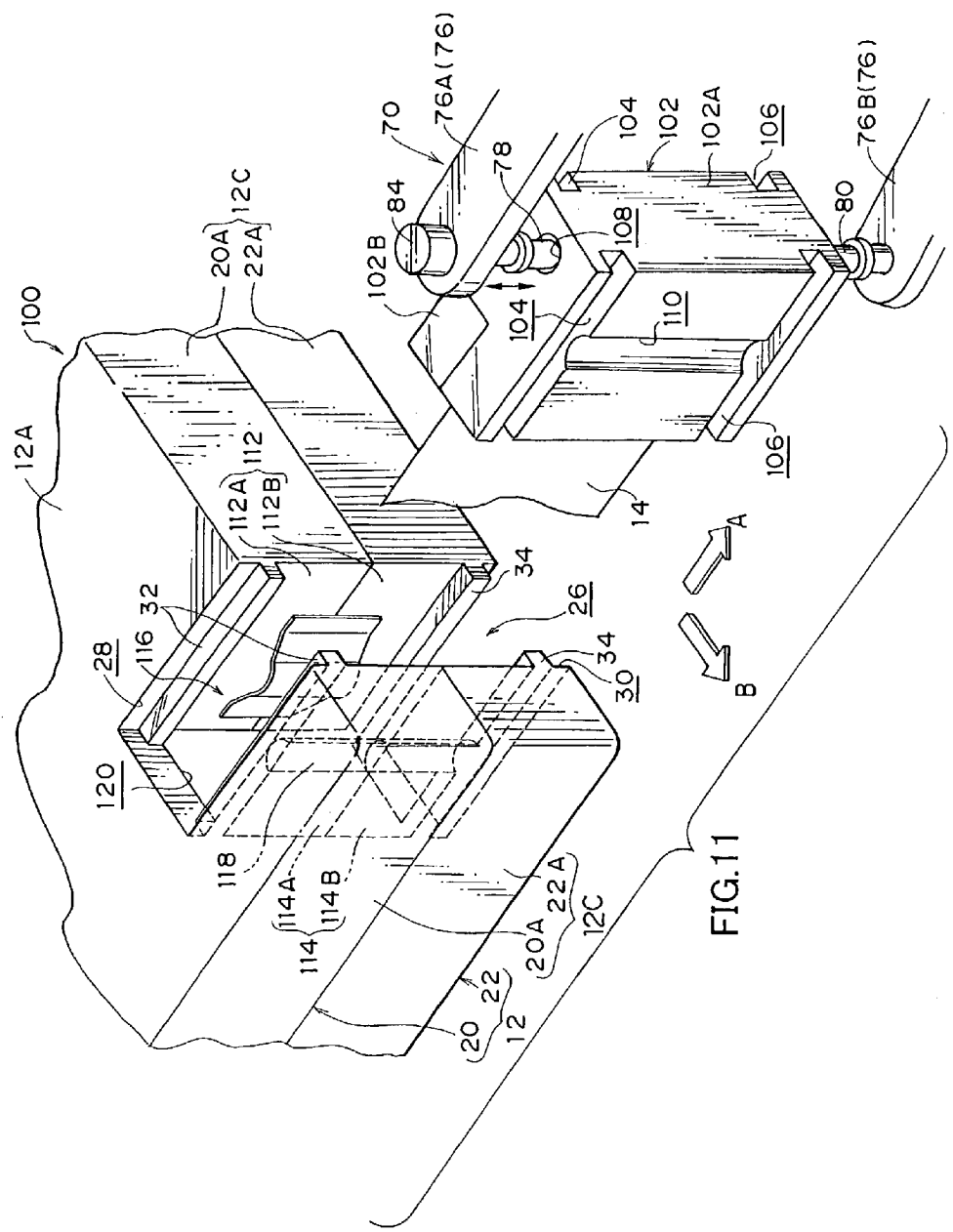
FIG. 11 is a perspective view corresponding to FIG. 5 and illustrating the modified example of the recording tape cartridge relating to the embodiment of the present invention.

As shown in FIGS. 10 and 11, a recording tape cartridge 100 relating to the modified example differs from the recording tape cartridge 10 with regard to the points that a leader block 102 is provided as the leader portion in place of the leader portion 18, and the shutter 36 is not provided.

The leader block 102 nips the distal end of the magnetic tape 14 between a main body 102A and clamp member 102B, and is formed in a substantially rectangular parallelepiped block shape on the whole. The main body 102A and the clamp member 102B are joined by welding, or by unillustrated convex portions and concave portions fitting together, or the like.

A pair of left and right guide grooves 104, into which the pair of guide ribs 32 of the case 12 can be inserted, and a pair of left and right guide grooves 106, into which the pair of guide ribs 34 of the case 12 can be inserted, are provided in the leader block 102 along the entire length thereof along the longitudinal direction of the magnetic tape 14.

An engaging concave portion 108 is formed in each of the top and bottom end surfaces of the leader block 102 (the end surfaces in the widthwise direction of the magnetic tape 14). The lower engaging concave portion 108 is not illustrated. A holding concave portion 110, which is circular arc shaped in cross-sectional view, is formed in the arrow B side end surface of the leader block 102 between the upper and lower guide grooves 104, 106.

Deeper into the case 12 than the opening 26 thereof, walls 112, 114 extend along the direction of arrow A from the left and right edge portions of the opening 26. The wall 112 is formed by end surfaces of an upper wall 112A and a lower wall 112B, which stand erect from the upper case 20 and the lower case 22 respectively, abutting one another. The wall 112 connects the ceiling plate 12A and the bottom plate 12B (connects between the guide ribs 32, 34) along the left edge portions of the cut-out portions 28, 30. A plate spring 116, for urging the leader block 102 toward the right, is attached to the central portion of the wall 112.

The wall 114 is formed by end surfaces of an upper wall 114A and a lower wall 114B, which stand erect from the upper case 20 and the lower case 22 respectively, abutting one another. The wall 114 connects the ceiling plate 12A and the bottom plate 12B (connects between the guide ribs 32, 34) along the left edge portions of the cut-out portions 28, 30. A convex portion 118, which corresponds to the holding concave portion 110 of the leader block 102, projects along the entire height of the wall 114 at the longitudinal direction central portion of the wall 114.

A window portion 120 is formed deeper in the case 12 than the opening 26 thereof. The window portion 120 is prescribed by the rear edge portion of the cut-out portion 28 at the ceiling plate 12A, the rear edge portion of the cut-out portion 30 at the bottom plate 12B, and the rear ends of the walls 112, 114.

In the recording tape cartridge 100 relating to the present embodiment, when the recording tape cartridge 100 is not in use (e.g., is being stored or transported), the leader block 102 is held within the case 12. Specifically, in the state in which the guide ribs 32, 34 of the case 12 are slidably inserted in the guide grooves 104, 106 of the leader block 102, and the convex portion 118 of the case 12 has entered in the holding concave portion 110, the leader block 102 is pushed against the wall 114 by the urging force of the plate spring 116.

Namely, the leader block 102 falling out in the front-rear direction from the case 12 is impeded due to the concave portion 118 which has entered into the holding concave portion 110. Further, falling out in the up-down direction is impeded by the guide ribs 32, 34 which are inserted in the guide grooves 104, 106. In this state, the leader block 102 closes the window portion 120 (i.e., the opening 26).

Next, when the recording tape cartridge 100 is loaded in the drive device 50 along the direction of arrow A by being guided by the guide ribs 32, 34 and the walls 112, 114, in the same way as in the above-described case of the recording tape cartridge 10 except for the movement of the shutter 36, due to movement of the bucket in the direction of arrow A, the top and bottom engaging concave portions 108 are positioned between the extending/contracting pin 78 and the fixing pin 80. In this state, when the bucket is lowered, the distal end of the fixing pin 80 enters into the engaging concave portion 108 at the bottom side. Then, the guiding mechanism 70 extends the extending/contracting pin 78 so as to make the distal end thereof enter into the engaging concave portion 108 at the top side.

In this way, due to the leader block 102 being nipped from above and below between the extending/contracting pin 78 and the fixing pin 80, the leader block 102 is held by the guiding mechanism 70, and is guided to the take-up reel 58 due to the first arm 74 of the guiding mechanism 70 rotating. The leader block 102 is fit-into a fit-in portion (not shown) which is formed in a recessed manner in the reel hub 60 of the take-up reel 58. The clamp member 102B side end surface of the leader block 102 forms the outer peripheral surface of the reel hub 60 and the take-up surface which takes up the magnetic tape 14. Thus, the clamp member 102B side end surface of the leader block 102 between the guide grooves 104, 106 is preferably formed in a circular arc shape, as seen in plan view, so as to correspond to the outer peripheral surface of the reel hub 60.

Thereafter, in exactly the same way as the above-described recording tape cartridge 10, information is recorded onto the magnetic tape 14 of the recording tape cartridge 100, or information recorded on the magnetic tape 14 of the recording tape cartridge 100 is played back.

In the recording tape cartridge 100 relating to this modified example, the leader portion 18 is held between the extending/contracting pin 78 and the fixing pin 80 of the guiding mechanism 70 by the simple operation of the guiding mechanism 70 of the drive device 50. Further, the leader portion 18 can be made more compact.

The walls 112, 114, which connect the left and right edge portions of the cut-out portions 28, 30, are provided further back (i.e., at a deeper position) than the opening 26. Thus, the rigidity of the case 12 around the opening 26 is high, and the drop strength is high. Further, the direction of attaching and removing the leader block 102 to and from the case 12 is regulated in the direction along the direction of arrow A by the walls 112, 114 and the guide ribs 32, 34. Thus, it is difficult for the leader block 102 to drop off from the case 12 due to impact when the recording tape cartridge 100 is dropped or the like. Namely, at the recording tape cartridge 100, even if the shutter 36 is not provided, the dustproof quality and the ability of the leader block 102 to be held at the case 12 are good.

The present invention is not limited to the structures of the above-described embodiment and variant example, and the respective structural elements thereof can be appropriately combined (substituted). Accordingly, for example, the recording tape cartridge 100 may have the shutter 36, and the recording tape cartridge 10 may have the wall 112.

Further, in the above-described embodiment, the leader tape 38 is formed of a metal such as aluminum or stainless steel or the like. However, the present invention is not limited to the same. It goes without saying that the leader tape 38 may be formed of, for example, a resin material. Moreover, the leader tape 38 is not limited to the thickness and dimensional tolerance (0.1 mm±5 $\mu$m) of the above-described embodiment and modified example.

In the above-described embodiment, the magnetic tape 14 is connected via the splice tape 40 which is adhered to the concave portion 38A of the leader tape 38. However, the present invention is not limited to the same. For example, it is possible for the splice tape 40 to not be adhered to the concave portion 38A, and for the magnetic tape 14 to be connected in a state of being nipped between the bottom surface of the concave portion 38A and the splice tape 40. Moreover, for example, the leader tape 38 and the magnetic tape 14 may be directly connected by ultrasonic welding, heat sealing, adhesion, or the like.

Although the magnetic tape 14 is used as the recording tape in the above-described embodiment and modified example, the present invention is not limited to the same. It suffices for the recording tape to be interpreted as an elongated, tape-shaped information recording/playback medium on which information can be recorded and from which recorded information can be played back. It goes without saying that the recording tape cartridge relating to the present invention can be applied to recording tapes of any recording/playback systems.

In the above-described embodiment and modified example, the guiding mechanism 70 is structured to nip the leader portion 18 and the leader block 102 between the extending/contracting pin 78 and the fixing pin 80. However, the present invention is not limited to the same. For example, the extending/contracting pin 78 may be provided at the lower arm 76B, and the upper arm 76 having the fixing pin 80 may be formed so as to be movable up and down. Moreover, the guiding mechanism 70 is not limited to an arm mechanism.

As described above, the recording tape cartridge relating to the present invention has the excellent effects that it is provided with a leader portion which is held by a pull-out device of a drive device by simple operation of the pull-out device, and the leader portion can be made compact.

What is claimed is:
1. A recording tape cartridge comprising:
a case formed to be hollow by a ceiling plate and a bottom plate which oppose one another being joined by periph-eral walls, the case rotatably accommodating, in an interior of the case, a single reel on which a recording tape is wound;
an opening provided in the peripheral walls, the opening being for pulling the recording tape out of the case;
a leader portion provided at a distal end of the recording tape, and held within the case so as to face the opening; and
a pair of upper and lower cut-out portions communicating with the opening at opposing positions of the ceiling plate and the bottom plate, respectively, the cut-out portions exposing upper and lower ends of the leader portion when the leader portion is in a state of being held at the case;
wherein the leader portion has a leader tape connected to the distal end of the recording tape, and a pair of attaching pieces which extend toward the outer sides of the leader tape in a direction transverse to the direction which the leader tape is pulled out of the case, and
wherein the leader portion further has substantially rect-angular holding blocks respectively attached to the pair of attaching pieces.

2. The cartridge of claim 1, further comprising pairs of left and right guide ribs provided between the opening and the cut-out portions and projecting with respect to a direction in which the cartridge is loaded into the drive device.

3. The cartridge of claim 1, wherein the leader tape is formed of a thin metal film, and a thickness of the leader tape is a value within a predetermined range.

4. The cartridge of claim 1, wherein a length of the leader tape corresponds to a length of a circumference of a reel hub provided at the drive device.

5. The cartridge of claim 1, wherein the leader tape has a concave portion at an outer side of an end portion of the leader tape, which end portion is connected to the recording tape, and an adhesive tape is adhered so as to extend over the concave portion and the distal end of the recording tape.

6. The cartridge of claim 3, wherein the recording tape is a magnetic tape.

7. The cartridge of claim 3, wherein the thickness of the leader tape is 0.1 mm±5 $\mu$m.

8. The cartridge of claim 5, wherein a depth of the concave portion corresponds to a thickness of the adhesive tape, and in a state in which the adhesive tape is adhered, a surface at the outer side of the leader tape and a surface of the adhesive tape are substantially flush with one another.

9. The cartridge of claim 1, wherein the holding blocks have holding grooves into which the attaching pieces can be inserted, and depths of the holding grooves do not exceed lengths by which the attaching pieces extend from the leader tape.

10. The cartridge of claim 1, wherein lengths of the cut-out portions in a direction in which the cartridge is loaded into the drive device correspond to lengths of the holding blocks.

11. The cartridge of claim 6, wherein the leader tape is formed of a non-magnetic material.

12. The cartridge of claim 6, wherein a thickness of the magnetic tape is a value in a range of 6 $\mu$m to 20 $\mu$m.

13. The cartridge of claim 9, wherein the holding grooves into which the attaching pieces are inserted are formed in substantially circular arc shapes such that a distal end portion of the leader tape is curved via the attaching pieces.

14. The cartridge of claim 9, further comprising pairs of left and right guide ribs which are provided between the opening and the cut-out portions and which project with respect to a direction in which the cartridge is loaded into the drive device, and the guide ribs are provided within ranges of thicknesses of the ceiling plate and the bottom plate, and a depth from an outer surface of the ceiling plate to top surfaces of the guide ribs at an upper side, and a depth from an outer surface of the bottom plate to bottom surfaces of the guide ribs at the lower side, correspond to thicknesses of the holding blocks.

* * * * *